United States Patent [19]

Müller et al.

[11] Patent Number: 4,615,596

[45] Date of Patent: Oct. 7, 1986

[54] APPARATUS FOR PRODUCING PHOTOGRAPHIC PICTURES OF PROJECTION SCREEN IMAGES

[75] Inventors: Jürgen Müller, Munich; Heinz Kröbel, Taufkirchen; Michael Reichart; Günther Schindlbeck, both of Munich, all of Fed. Rep. of Germany

[73] Assignee: Agfa-Gevaert Aktiengesellschaft, Leverkusen, Fed. Rep. of Germany

[21] Appl. No.: 731,479

[22] Filed: May 7, 1985

[30] Foreign Application Priority Data

May 22, 1984 [DE] Fed. Rep. of Germany ....... 3418960

[51] Int. Cl.$^4$ .................. G03B 29/00; G03B 27/46
[52] U.S. Cl. .......................................... 354/76; 355/54
[58] Field of Search ............. 355/53, 54, 43, 45; 354/76

[56] References Cited

U.S. PATENT DOCUMENTS

| | | | |
|---|---|---|---|
| 3,674,367 | 7/1972 | Chapman | 355/53 X |
| 3,796,489 | 3/1974 | Sone et al. | 355/54 |
| 4,027,315 | 5/1977 | Barney | 354/76 |
| 4,229,098 | 10/1980 | Schmoker | 355/43 X |
| 4,285,587 | 8/1981 | Schiff et al. | 354/76 X |
| 4,481,541 | 11/1984 | Ioannidis et al. | 354/76 X |

FOREIGN PATENT DOCUMENTS

| | | |
|---|---|---|
| 2240507 | 11/1978 | Fed. Rep. of Germany . |
| 2409154 | 2/1979 | Fed. Rep. of Germany . |
| 3125397A1 | 12/1982 | Fed. Rep. of Germany . |
| 3146963A1 | 1/1983 | Fed. Rep. of Germany . |

Primary Examiner—Donald A. Griffin
Attorney, Agent, or Firm—Michael J. Striker

[57] ABSTRACT

Apparatus for producing photographs from an image screen of a monitor, said apparatus consisting of a slidable sheet film platform, a means for sliding said sheet film platform in a Z coordinate direction, means for moving the image screen perpendicular to the Z direction in both X and Y coordinate directions, and a lens situated between said image screen and said film platform for providing a focused image on the sheet film, said lens being connected to said image screen so that the two can be moved together in the X direction, but are still capable of independent movement in the Y direction.

16 Claims, 11 Drawing Figures

FIG. 3a      FIG. 3b      FIG. 3c      FIG. 3d
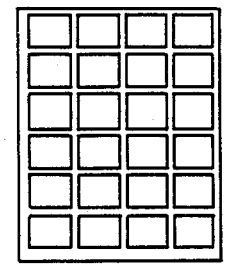  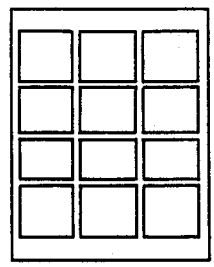  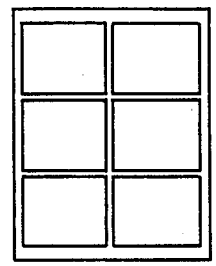  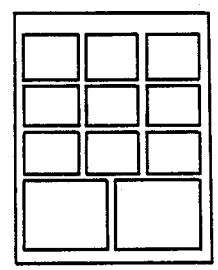
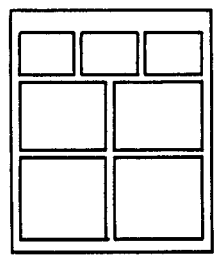  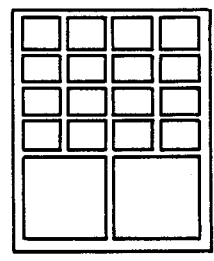  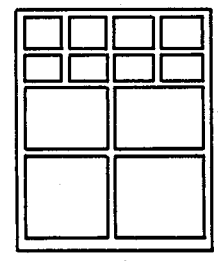  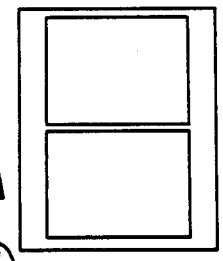
FIG. 3e      FIG. 3f      FIG. 3g      FIG. 3h
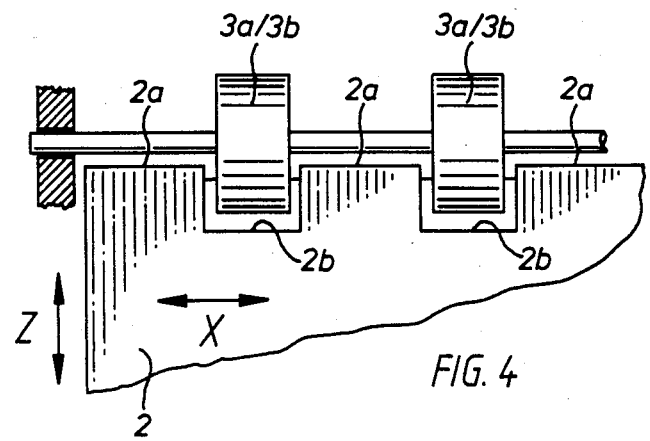
FIG. 4

APPARATUS FOR PRODUCING PHOTOGRAPHIC PICTURES OF PROJECTION SCREEN IMAGES

BACKGROUND OF THE INVENTION

The invention relates to an apparatus for producing photographic pictures from a projection screen of a monitor projecting for example x-ray or ultrasonic images, whereby an adjustable lens is provided between the projection screen and film platform, which holds the film in an exposure position, provide a clear projection of the projection screen images the film.

A device of this type to produce moving picture film from screen images is known for example from German Patent DE-OS 31 46 963. Moving picture film is however not suited for a series of diagnostic purposes. An x-ray picture arrangement, which produces a number of images next to and above and below one another on a sheet film, is known from the patent DE-AS No. 24 09 154. Moreover, x-ray picture devices with loading and unloading and/or developing stations for the sheet film to be used are known from, for example, patents DE-OS No. 31 25 397, or DE-PS No. 22 40 507. This art does not deal with a device suited for projection screen photography that is used, for example, in x-ray and ultrasonic diagnosis which is gaining greater significance.

SUMMARY OF THE INVENTION

It is an object of the present invention to provide an apparatus that takes photographs of projection screen images in a simple manner which allows various orders and sizes of photographs to be put next to and between one another on a sheet film.

Pursuant to this object, and others which will become apparent hereafter, one aspect of the invention resides in a sheet film platform that is slidable in a coordinate direction to produce columns of pictures and to allow loading and unloading of film. At the same time a monitor is slidable in two coordinate directions perpendicular to that mentioned above, the sliding in one direction adjusting the picture size, and the sliding in the other direction producing rows of pictures at right angles to the columns of pictures. This thereby provides a simple adjustable mechanism for setting the film platform and the monitor, that, if necessary, can be made serviceable and adjustable by simple hand manipulation. Due to the easy adjustability it is possible to preselect size and order of desired photograph pictures on a sheet film by means of an electronic control with programmed preselection controlled by a selection keyboard. This arrangement also provides other advantages. For example, by using a swivel-mounted surface mirror that slides with the monitor, and by turning the mirror around at a specific position or following a specific position, the taking of plan film pictures with a roll film camera taking either still or moving pictures on roll film is made possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 3A to 3H format combinations of series image screen pictures on a flat film means as shown in FIG. 1; and FIG. 4 is a view showing the transport rollers for loading and unloading and the cutouts in the flat film platform of FIG. 1.

DETAILED DESCRIPTION OF THE PREFERRED EMBODIMENTS

Figure 1:
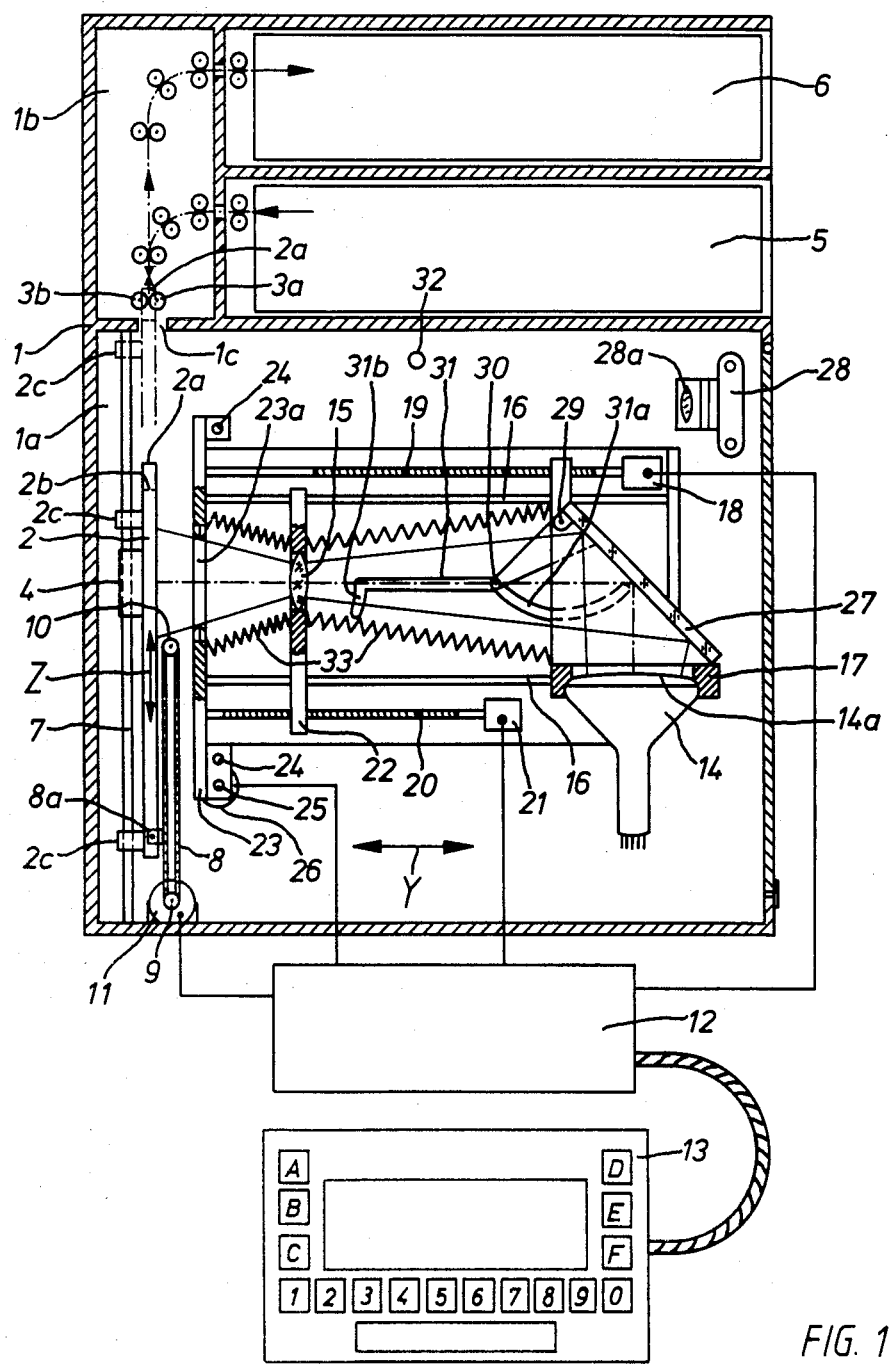
FIG. 1 shows a partial schematic view of an apparatus for photographing projection screen images on a flat film pursuant to the invention.
Figure 2:
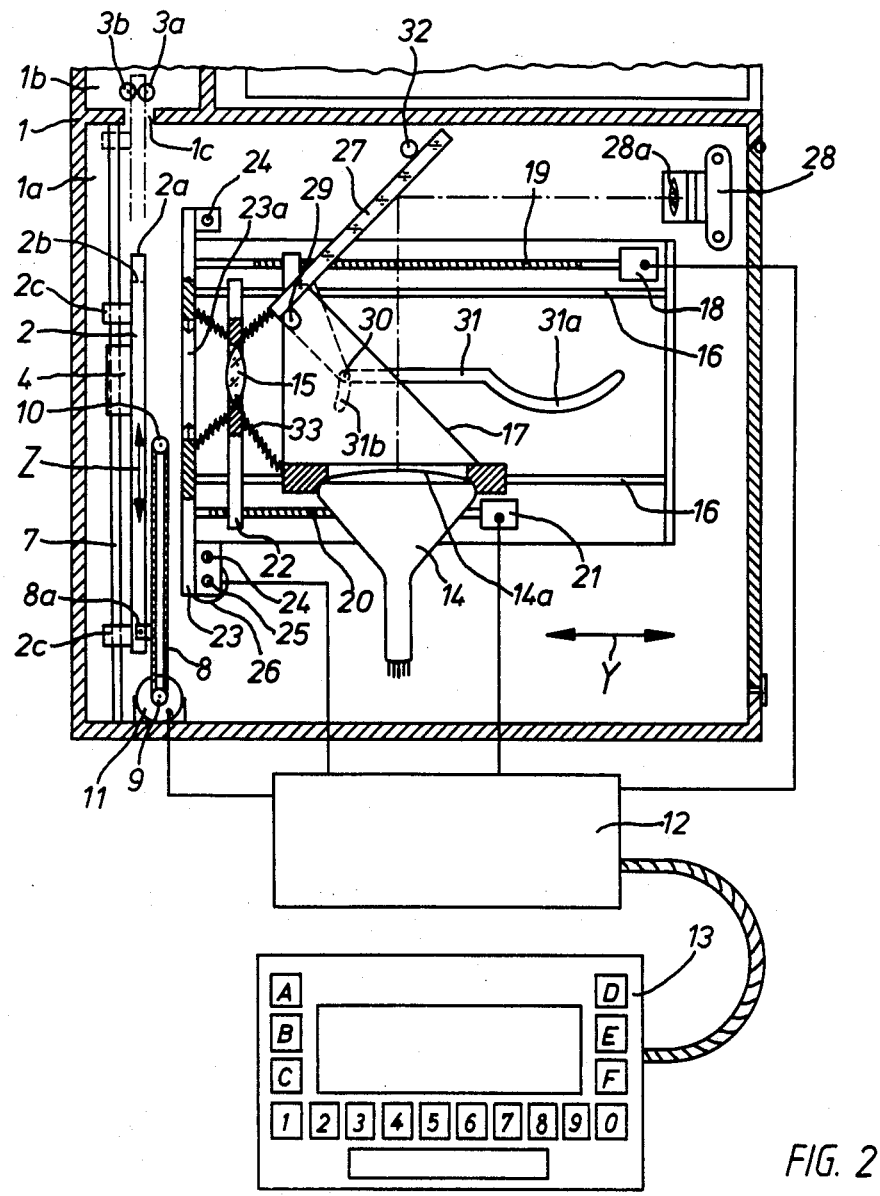
FIG. 2 is a partial view of the apparatus in FIG. 1 set in a position for photographing with a roll film camera.

In FIGS. 1 and 2 is a schematically represented housing 1. This housing has two main portions, a photographing portion 1a and a film loading and unloading portion 1b, the two portions 1a and 1b being connected by a slot 1c. The slot 1c extends in the direction of a coordinate, according to the Figures in the direction of the X axis, and has a width in the Y direction large enough to accept a film platform 2 which is slidable in the Z direction. An outer edge 2a of the film platform 2 is slidable into the loading and unloading portion 1b to the area of a pair of transport rollers 3a, 3b. The film platform 2 has a known vacuum device 4 and a number of vacuum holes, not shown, extending therethrough. The vacuum device 4 and the vacuum holes serve to hold the film in a vertical position on a picture taking side of the film platform 2. As seen in FIG. 4, a plurality of sets of transport roller pairs 3a, 3b are provided axially of one another, and the outer edge 2a of the film platform 2 has a plurality of cutouts 2b at set intervals corresponding to the sets of roller pairs. The cutout 2b has a width slightly greater than the width of the rollers so that the rollers may be accepted into the cutout 2b. The roller pairs 3a, 3b are introduced into the cutouts 2b when the film platform 2 is slid, in a manner which will be described in more detail later on, in the Z direction to its uppermost loading and unloading position.

In the loading and unloading portion 1b slide-in units 5 and 6 are provided in a known manner when using x-ray photographing apparatus or cassette loading and unloading apparatuses. Other types of sliding units can also be used. At least one of the sliding units holds a sheet film supply magazine with transport means to transport the film to the transport rollers 3a, 3b. The second sliding unit 6 can have an intermediate magazine to block out light from the exposed film with the help of the roller pairs 3a, 3b. It is also possible to provide a developing machine as a further component connected to the loading and unloading portion 1b. By known methods the supply magazines or intermediate magazines and as the case may be the developing machine perform their functions with one side shut off from light. Since the above-discussed matter concerning supplying and developing the film and keeping light away from one side of the film are all known in the art and are not an essential part of the present invention, only a series of further transport roller pairs are shown schematically without reference numbers in FIGS. 1 and 2. As indicated in broken lines in FIG. 1, or as in FIG. 4, the film platform 2 is slided to its uppermost position to allow loading or unloading. In this position, the film to be unloaded which lays accessible to the cutouts 2b, is grasped by the roller pairs 3a, 3b and led to the intermediate magazine 6 or the developing machine when the vacuum device is shut off. In the reverse, the new film to be loaded is taken from the supply magazine and again led over the roller pairs 3a, 3b to the film platform 2. When the film takes its proper position on the film platform 2, the vacuuming device is triggered to function and the film platform 2 is led downward to its working position.

A stepwise or stagewise driveable mechanical or electromechanical sliding device is provided to move the film platform 2 in one direction in a known, exact parallel displacement. In the illustrated embodiments, the platform 2 is provided with a plurality of arms 2c on its back side which have exact bores and are vertically slidable on at least two parallel bars, one bar 7 being visible in the drawings. A toothed belt drive 8 or a tow-cable is driveable over two rollers 9, 10 in fixed distances by means of a controller 12 and an electromotor 11. The toothed drive belt 8 or tow-cable is also connected to the film platform 2 at one position 8a so that by moving the toothed belt or tow-cable the film platform 2 moves a corresponding distance upwards or downwards in the Z direction. The corresponding distances are determined by a preselected function of the selection keyboard 13. For example, to arrive at an arrangement and size of pictures to be photographed as shown in FIG. 3A, the film platform 2 is moved six equal steps in each column. To further explain, the film platform 2 is first moved upwards for the first photograph column, and then moved downwards for the second photograph column and again moved upwards for the third photograph column, and finally moved downwards for the last photograph column. For other suitable, distributed, preselectable photograph frame divisions, for example as shown in FIGS. 3B to 3H, the steps of the film platform 2 in the Z direction are appropriately programmed as required. Thereby, the film platform 2 has only one upward or downward movement in the Z direction.

In order to provide photographs on the film not only in vertical columns, but also in horizontal rows, as in the X direction next to one another and in various sizes, a monitor 14, the picture screen 14a of which is to be photographed from, is mounted slidably in the X and Y directions at right angles to the sliding direction of the film platform 2. The picture screen 14a can thereby be oriented parallel to the film platform 2, and a photographic lens 15 can be adjustably oriented between the film platform 2 and the picture screen 14a. According to the illustrated embodiments, the to be photographed picture screen 14a is however directed upwardly and horizontally in the XY plane. The monitor 14 is movable in the Y direction by means of a frame 17 having bore holes, which are not precisely shown in the drawings that is slidable over aparallel carrier arm 16 and is moved by a driving spindle 19 which is moved by a second electromotor 18. The lens 15 is also slidable along the carrier bars 16 by means of a second spindle 20. The second spindle 20 is driven by a third electromotor 21. The control that provides a preselected or programmed enlargement or reduction of a projection screen picture by changing corresponding positions of the lens 15 and the projection screen 14a in the Y direction, is provided by the controller 12 according to the program preselected on the selection keyboard 13. The carrier bars 16 with the carrier frames 17 and 22 for the monitor 14 and the lense 15, respectively, are held by a main supporting plate 23 which is parallel to the film platform 2. The main supporting plate 23 contains an aperture or a frame shutter 23a. The main supporting plate 23 moves slidably in the X direction along guiding bars 24 which are fastened to the housing 1. A third spindle 25 which is driven by a fourth electromotor 26 moves the main supporting plate 23 stepwise from picture to picture in every picture line. This fourth electromotor 26 is controlled by the controller 12 according to a planned program.

Setting either an enlarged or reduced projection screen image which is to be photographed, is achieved by suitable displacement of the lens 15 and the projection screen 14a in the Y direction. Photographing pictures in a vertical column is accomplished by sliding the film platform 2 in the Z direction and maintaining the projection screen 14a in a fixed position. Photographing the images in a horizontal column is accomplished by sliding the projection screen 14a together with the lens 15 in the X direction while maintaining the film platform 2 in a fixed position.

In addition, according to the illustrated embodiments, since the projection screen 14a is positioned horizontally, a surface mirror 27 must be provided between the projection screen 14a and the lens 15 at a 45° angle to the projection screen and the lens. The surface mirror 27 is connected to the projection screen 14a so that it is slidable along with the projection screen. The mirror 27 has two positions, a first position as shown in FIG. 1, which projects the projection screen image to the lens 15, and a second position as shown in FIG. 2, wherein the mirror 27 is rotated through 90° so that the projection screen image is projected through a lens 28a of a roll film camera 28 onto a film plane. To accomplish this, the surface mirror 27 is connected to the monitor frame 17 so that the mirror 27 can swivel about an axis 29. The mirror 27 has a normal position which facilitates sheet film photography. This normal position is maintained by the horizontal edge of the mirror 27, which is distant from and parallel to the axis 29, resting on the edge of the monitor 14 or on a stopper as a result of the force of gravity. The mirror 27 has at least one horizontal angle part in the YZ plane which is provided with a control peg moveable in the X direction, the control peg engaging in a guide slot 31 to control its motion. The guide slot 31 has an end area 31a shaped in an arc about the axis 29. When the mirror 27 is in its furthest position from the film platform 2, as shown in FIG. 1, it can be turned in a counterclockwise direction by hand from outside of the housing through a lockable lid of the housing so as to prevent contamination of the photographing equipment. At the end of the guide slot 31 which is closest to the film platform, there is a small curved piece 31b that is so formed that when the monitor 14 is moved past the end position for film photographs, as shown in FIG. 2, the mirror 27 is rotated counterclockwise 90° to an upper position where it contacts a figuration, as shown in FIG. 2, the stopper 32. In this configuration, as shown in FIG. 2, the projection screen image of the monitor 14 is projected into the lens 28 a of the roll film camera 28. This is also accessible through the housing lid as mentioned above, or by another type of housing lid, it is operable in the above-discussed manner or by means of a remote control device. The lid can be detachably fastened in any known manner to the housing 1 or the photographing portion 1a.

It requires barely any mention that between the film platform 2, lens 15 and the frame 17 for the monitor it is necessary to provide light tight bellows 33. It is true that it will be slightly easier to mount the monitor so that the image screen 14a is parallel to the film platform 2, however, with such an arrangement the rotation of the surface mirror 27 for roll film photography is made considerably more difficult. It would therefore be necessary to either not provide bellows, or to provide one or more pivotable surface mirrors that can be temporarily uncoupled and slid together. In order to keep the camera accessible in this configuration, it is necessary that two surface mirrors be used for roll film photography, and that the mirrors be pivotable and sloped towards one another.

In the setting of the apparatus for a still picture roll film camera as described above, a moving picture camera can be substituted for the still film camera as required. The belt drive 8 or the spindle drive 19, 20, 25 can consist of other types of drives as are appropriate to accomplish the desired objectives, such as known drives like worm drives, or gear drive and rock and pinion drive.

While the invention has been illustrated and described as embodied in an apparatus for taking photographs of projection screen images, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Apparatus for producing photographs of an image of a monitor, comprising: a housing; a sheet film platform slidably supported in said housing; means for slidably moving sheet film platform in a Z coordinate direction; means for moving the image screen so that it moves perpendicular to the Z coordinate direction, in both an X and a Y coordinate direction; and a movable lens oriented between the image screen and said sheet film platform to provide a focused picture of an image on the image screen on a sheet film on said sheet film platform, said lens being coupled to the image screen in such a way that said lens and the image screen are independently adjustable in the Y direction perpendicular to the Z coordinate plane for adjusting picture size and focusing, and so that said lens and the image screen are slidable together in the X coordinate direction perpendicular to the Y coordinate plane.

2. Apparatus as defined in claim 1; and further comprising means for moving said lens in the Y coordinate direction individually of the image screen.

3. Apparatus as defined in claim 1, wherein said means for moving the image screen is means for moving the image screen stepwise in the X and Y coordinate directions.

4. Apparatus as defined in claim 1, wherein said means for moving the image screen is means for moving the image screen gradually in the X and Y coordinate directions.

5. Apparatus as defined in claim 1, wherein said platform moving means includes a step drive mechanism.

6. Apparatus as defined in claim 1, wherein said means for moving the image screen is means for moving the image screen.

7. Apparatus as defined in claim 1, wherein said lens has an axis, and the image screen is mounted approximately parallel to the X and Y coordinate directions in which it slides; and further comprising a pivotable surface mirror having two positions, which in its one position is located between the image screen and said lens at an angle of approximately 45° to the image screen and also at an angle of approximately 45° to said lens axis, and in its other position said mirror is rotated through 90° and is thereby oriented between the image screen and a roll film camera which is attachable to said housing.

8. Apparatus as defined in claim 7, wherein said surface mirror is connected with the image screen so that it is also slidable in the Y coordinate direction; and further comprising a pin and guide slot arrangement running in the Y direction and having two end positions, the first end position causing said mirror to pivot into a position for photographing on a sheet film and the second end position causing said mirror to pivot into a position suitable for photographing on a roll film or for cleaning said mirror.

9. Apparatus as defined in claim 8, wherein said control slot of said pin and control slot arrangement has curved end areas for pivoting said mirror, and has a rectilinear portion associated for use with photographing on a sheet film.

10. Apparatus as defined in claim 8, wherein said surface mirror has a pivot axis at its one end which is also connected with the image screen; and further comprising a connecting member having one end connected to said mirror at said pivot axis and another end connected to said guide slot by said pin.

11. Apparatus as defined in claim 10; and further comprising a carrier plate for the image screen, which connects said image screen to said pivot axis of said mirror.

12. Apparatus a defined in claim 1; and further comprising a control mechanism and a selecting mechanism, said selecting mechanism allowing selection of size and quantity of image screen photographs on a plate film situated on said film platform by way of said control mechanism which in response to the size and quantity selected by the selecting mechanism causes the necessary movement of the film platform in the Z direction, the lens in the Y direction and the image screen in the X and Y directions.

13. Apparatus as defined in claim 1, wherein said film platform is slidable upward into a loading and unloading position; and further comprising a film supply magazine and an intermediate magazine for taking up the exposed film when said film platform is in the loading and unloading position.

14. Apparatus as defined in claim 13; and further comprising a film developing machine to immediately develop the film upon unloading.

15. Apparatus as defined in claim 13; and further a plurality of transport roller pairs oriented axially of each other, and wherein said film platform has an upper edge provided with a plurality of cutouts corresponding to said transport roller pairs, so that when said film platform is in the loading and unloading position said transport roller pairs project into said cutouts and grab said film to facilitate loading and unloading.

16. Apparatus as defined in claim 1; wherein said film platform is slidable upward into a loading and unloading position; and further comprising a film supply magazine and an developing machine for taking up the exposed film when said film platform is in the loading and unloading position.

* * * * *